Patented May 30, 1950

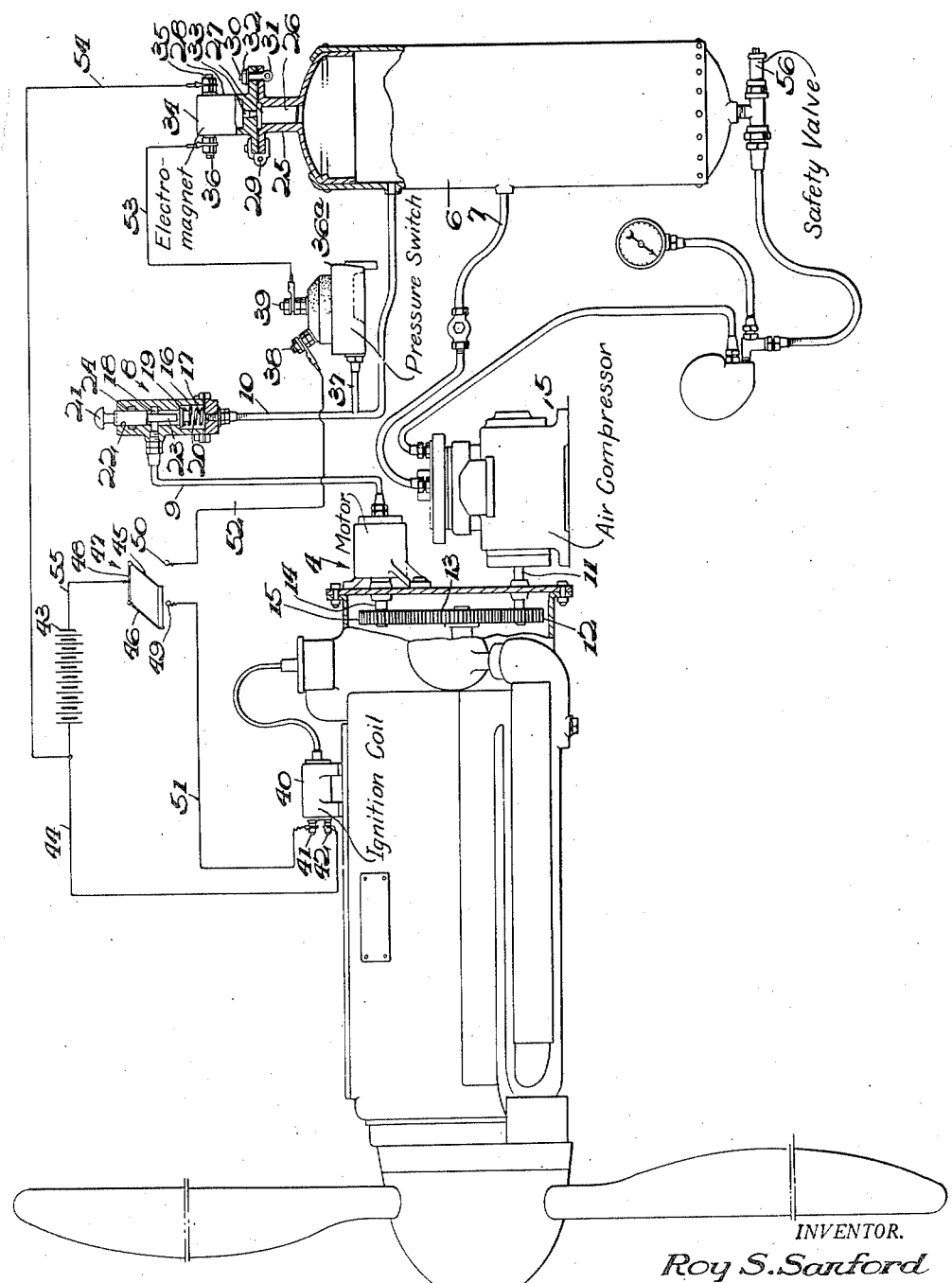

2,509,942

UNITED STATES PATENT OFFICE 2,509,942

FLUID PRESSURE SYSTEM WITH AUTOMATIC MEANS FOR REPLENISHING PRESSURE

Roy S. Sanford, Woodbury, Conn., assignor to Bendix-Westinghouse Automotive Air Brake Company, Elyria, Ohio, a corporation of Delaware Application November 2, 1944, Serial No. 561,612

7 Claims. (Cl. 60—18)

This invention relates to fluid pressure control mechanism, and more particularly to mechanism for supplying fluid pressure to a fluid motor for starting the engine of a vehicle such as an airplane or automobile.

In connection with the starting mechanism of internal combustion engines, it has previously been proposed to provide a motor operated by a compressed fluid such as air for starting the engine of the airplane, together with means including a compressor driven by the engine and the reservoir connected to the compressor for insuring a supply of compressed air sufficient to operate the starting motor at all times. In many cases, however, leakage of such systems has rendered them inoperative, and it is accordingly an object of the present invention to provide means for insuring an adequate supply of fluid pressure to operate the starting motor in the event of leakage of compressed air or other fluid from the supply reservoir.

Another object of the invention is to provide means for automatically insuring a supply of fluid pressure sufficient to operate the starting motor in the event of depletion of the supply of compressed air in the reservoir due to leakage.

Still another object of the invention is to provide means responsive to variations of pressure in the supply reservoir for supplying additional fluid pressure to the system automatically whenever the pressure in the supply reservoir drops below a predetermined value.

These and other novel features and objects of the invention will appear more fully hereinafter from the following detailed description when taken in connection with the accompanying drawing, wherein one form of the present invention is illustrated. It is to be expressly understood, however, that the drawing is utilized for the purpose of illustration only, and is not designed as a definition of the limits of the invention, a reference being had for this purpose to the appended claims.

In the drawing, the single figure illustrates diagrammatically, and partially in section, fluid pressure control mechanism for controlling the starting of an airplane engine.

The fluid pressure system is illustrated as including in general, a fluid motor 4 suitably connected to drive the airplane engine, as will be more fully described hereinafter, an air compressor 5 driven by an airplane engine and adapted to supply compressed air to a reservoir 6 through a conduit 7, and a control valve 8 connected with the fluid motor by means of a conduit 9 and with the reservoir 6 by means of a conduit 10. The compressor is provided with a crankshaft 11 having a gear 12 on the left end thereof adapted to mesh with a gear 13 carried on the crankshaft or other driven shaft of the airplane engine, the compressor thus being operable to compress air in the reservoir whenever the airplane engine is operating. In like manner, the fluid motor 4 is provided with a rotatable shaft 14, having a gear 15 on the left end thereof meshing with the gear 13 on the airplane crankshaft, it being understood that an over-running clutch, not shown, may be provided in the hub of the gear 15 in order to prevent rotation of the fluid motor by the crankshaft of the engine when the latter is running.

The starter control valve 8 includes a casing 16 having an inlet chamber 17 connected with the conduit 10, an outlet chamber 18 connected with the conduit 9, and a valve 19 adapted to close the lower end of the chamber 18 and normally maintained in closed position by means of a spring 20. A valve operating plunger 21 is slidably mounted in a bore 22 formed in the upper end of the casing, a projection 23 of reduced diameter formed on the lower end of the plunger being adapted on downward movement thereof to engage and open the valve 19 in order to establish communication between conduits 10 and 9 through chambers 17 and 18. In order to prevent leakage of air from the outlet chamber 18 past the plunger 21, a suitable seal 24 is provided in the bore 22. Thus on downward movement of the plunger 21, compressed air is supplied from the reservoir to the motor 4 through the passages described, and the motor is effective to turn the crankshaft of the engine.

Although leakage can ordinarily be prevented from the reservoir and the conduits connected thereto, leakage sometimes occurs due to excessive vibration of the parts, and it is therefore desirable to provide additional means for charging the reservoir in the event such leakage has occurred while the system has been inoperative over a considerable period of time. To this end, the upper end of the reservoir is provided with a breech portion 25 provided with a chamber 26 connected at its lower end with the interior of the reservoir and adapted to receive a suitable cartridge 27 loaded with a suitable explosive. A breech block member 28 is mounted on the breech portion 25 by means of a pivot pin 29, and is normally maintained in the position shown by means of a bolt 30 pivotally attached to the portion 25 by means of a pin 31, a nut 32 on the bolt serving to engage the flanged portion of the breech block 28 in order to maintain the block in the position shown above the cartridge. A firing pin 33 is slidably mounted in the breech block above the primer of the cartridge and is adapted to be moved downward by means of an electro-magnet 34, the coils of the magnet being connected at either end to terminals 35 and 36. It will thus be understood that in the event the magnet is energized by connecting the terminals with a suitable source of electricity, the firing pin will be rapidly moved downward to operate the primer to fire the cartridge, whereupon the burning of the explosive in the cartridge serves to charge the reservoir 6 sufficiently to insure satisfactory operation of the fluid motor 4.

It is desirable to provide for automatic firing of the cartridge in the event of depletion of the reservoir pressure below the value necessary to satisfactorily operate the motor 4 to start the engine, and to this end a pressure responsive switch 36a is provided and connected with the conduit 10 by means of a conduit 37. The switch is provided with terminals 38 and 39, and it is to be understood that the switch is so constructed as to establish a connection between these terminals when the pressure supplied to the switch through the conduit 37 from the reservoir is less than a predetermined value, and to break the connection between the terminals when the pressure exceeds a value sufficient to satisfactorily operate the motor 4. The airplane engine is provided with an ignition coil 40 having terminals 41 and 42, and a suitable storage battery 43 is connected at its left end with the terminal 42 by means of a wire 44, and at its right end to the contact bars 45 and 46 of an ignition switch 47 by means of a connecting bar 48. The switch 47 is shown in open position, and it is to be understood that on movement of the switch to closed position the bar 46 will engage a contact 49, while the bar 45 will engage a contact 50. The contact 49 is connected with the ignition coil terminal 41 by means of a wire 51, and the contact 50 is connected with the terminal 38 of the switch 36a by means of a wire 52. The terminal 39 of the switch 36a is in turn connected with the terminal 36 of the electro-magnet 34 by means of a wire 53, and the terminal 35 is connected to the wire 44 by means of a wire 54. Thus on movement of the switch 47 to closed position the circuit from the left end of the battery to the right end of the battery will be completed through the wire 44, the ignition coil 40, the wire 51, contact 49, bar 46, connecting bar 48 and wire 55 connected between the latter bar and the right end of the battery. At the same time, the terminal 38 of the switch 36a will be connected with the right end of the battery through the wire 52, the contact 50, the bar 45, the bar 48, and the wire 55, while the terminal 39 will be connected with the left end of the battery through the wire 53, the electro-magnet 34, the wire 54 and the wire 44.

During normal operation of the mechanism, the pressure in the reservoir 6 will be maintained at a predetermined relatively high value which may be limited by a safety valve 56 on the reservoir, and the switch 36a will thus be effective to prevent the flow of electricity between the terminals 38 and 39, and consequently through the electro-magnet 34. On depression of the starting valve plunger 21, the compressed air is supplied from the reservoir to the starting motor through the connections shown, and assuming that the ignition switch is moved to closed position, the airplane engine will be started in the usual manner. In the event of depletion of the compressed air supply, due to leakage or to excessive use of the starting motor, the pressure supplied to the switch 36a will drop sufficiently to cause the switch to establish a connection between the terminals 38 and 39, whereupon the circuit from the battery through the electro-magnet 34 will be completed and the firing pin 33 will be moved downward to fire the cartridge and recharge the reservoir with the gas resulting from the burning of the explosive in the cartridge, this occurring without requiring the performance of any additional operations by the pilot.

In a system of the above type, it is quite possible that the reservoir may be depleted due to leakage when the system is idle for long periods of time, and it is undesirable that the cartridge be automatically discharged during such periods. To this end, the current of the electro-magnet 34 is connected through the ignition switch as heretofore described in order to positively prevent operation of the electro-magnet and the firing pin to fire the cartridge except when the ignition switch has been closed by the pilot for the purpose of starting the engine.

There has thus been provided, by the present invention, means for normally charging a reservoir with compressed air when the engine is operating for the purpose of insuring an adequate supply of compressed air for the operation of the starting motor, together with means for automatically replenishing the supply of fluid pressure in the reservoir when the ignition switch is closed to start the engine, in the event the pressure in the reservoir is insufficient to insure satisfactory operation of the starting motor. When a cartridge has been discharged, a new cartridge can be inserted by loosening the nut 32 and moving the breech block to open position about the pivot pin 29.

While the invention has been illustrated and described herein with considerable particularity, it is to be clearly understood that the same is not limited to the form shown, but may receive a variety of mechanical expressions, as will now readily appear to those skilled in the art. Reference will, therefore, be had to the appended claims for a definition of the limits of the invention.

What is claimed is:

1. In a fluid pressure supply system for a fluid motor having a reservoir connected with the motor and a compressor for supplying fluid pressure to the reservoir, auxiliary means for supplying fluid pressure to the reservoir when the pressure therein is less than a predetermined value including a chamber connected to the reservoir, a charge of explosive in said chamber, means for firing said charge, and means responsive to variations of pressure in the reservoir for rendering said firing means operative to fire said charge when said pressure is less than said predetermined value.

2. In a fluid pressure supply system for a fluid motor having a reservoir connected with the motor and a compressor for supplying fluid pressure to the reservoir, auxiliary means for supplying fluid pressure to the reservoir including a chamber connected to the reservoir, a charge of explosive in said chamber, means including an electro-magnet for firing said charge, and means for energizing said electromagnet to fire said charge when the pressure in the reservoir drops below a predetermined value including a switch controlled by variations of pressure in the reservoir.

3. Starting mechanism for an internal combustion engine of the type having an ignition system, said mechanism including a reservoir charged with fluid pressure, a fluid motor having a driving connection with the engine, a connection between said reservoir and motor, a valve associated with said connection for controlling the flow of fluid pressure to the motor, a chamber connected with the reservoir, a charge of explosive in said chamber, means including a circuit having an electromagnet for firing said charge, and having also a switch controlled by variations of pressure in the reservoir and connected in series with the electromagnet, and a single switch for simultaneously controlling the flow of electrical energy to the ignition system and said circuit for energizing the electromagnet to fire said charge when the single switch is closed and the pressure in said reservoir drops below a predetermined value.

4. Starting mechanism for an internal combustion engine of the type having an ignition system, said mechanism including a reservoir charged with fluid pressure, a fluid motor having a driving connection with the engine, a connection between said reservoir and fluid motor, a valve associated with said connection for controlling the flow of fluid pressure from the reservoir to the motor, a chamber connected with the reservoir, a charge of explosive in said chamber, means including an electromagnet for firing said charge, and means for controlling the energization of said magnet including a switch for controlling the energization of said ignition system and a pressure responsive switch connected to be controlled by said first named switch and connected in series with the electromagnet and controlled by variations of pressure in said reservoir.

5. Auxiliary charging mechanism for a reservoir adapted to supply fluid pressure to the fluid pressure operated starting motor of an internal combustion engine of the type having an ignition system, a switch for controlling the energization of the ignition system, and a compressor driven by the engine for supplying fluid pressure to the reservoir, said mechanism including a chamber having a connection with the reservoir, a charge of combustible material in said chamber, means including an electrical circuit for igniting said charge, and means for controlling the energization of said circuit including said switch, and a pressure responsive switch connected in series in said circuit and controlled by variations of pressure in said reservoir.

6. Charging mechanism for a reservoir adapted to supply fluid pressure to the fluid pressure operated starting motor of an internal combustion engine of the type having an ignition system and a switch for controlling the energization of said system, said mechanism including a chamber connected with the reservoir, an explosive cartridge in said chamber, a firing pin for firing said cartridge, an electromagnet for actuating said firing pin, and means for controlling the energization of said electromagnet including a pressure responsive switch serially connected with said electromagnet and controlled by the first named switch and controlled by variations of pressure in said reservoir.

7. In a fluid pressure supply system having a compressor, a reservoir, means to drive said compressor, means connecting said compressor and reservoir to charge the latter with fluid pressure, auxiliary means for supplying fluid pressure to the reservoir when the pressure in the latter is less than a predetermined value including an explosive device, a firing device having a movable element for exploding said explosive device, power means for controlling the firing device to move said element to exploding position, and means including a member responsive to variations in pressure in the reservoir for energizing said power means when said pressure is less than said predetermined value.

ROY S. SANFORD.

REFERENCES CITED

The following references are of record in the file of this patent:

UNITED STATES PATENTS

| Number | Name | Date |
|---|---|---|
| 53,758 | Gros | Apr. 3, 1866 |
| 405,229 | Schneider | June 11, 1889 |
| 748,098 | Priest | Dec. 29, 1903 |
| 776,545 | Porter | Dec. 6, 1904 |
| 858,468 | Richards | July 2, 1907 |
| 1,213,172 | Erwin | Jan. 23, 1917 |
| 2,299,466 | Coffman | Oct. 20, 1942 |
| 2,309,978 | Pratt | Feb. 2, 1943 |

FOREIGN PATENTS

| Number | Country | Date |
|---|---|---|
| 14,814 | Great Britain | June 18, 1897 |
| 373,739 | France | Mar. 27, 1907 |